March 18, 1930.  J. N. GOOD  1,750,635
VARIABLE LOAD BRAKE
Filed July 3, 1928  2 Sheets-Sheet 2
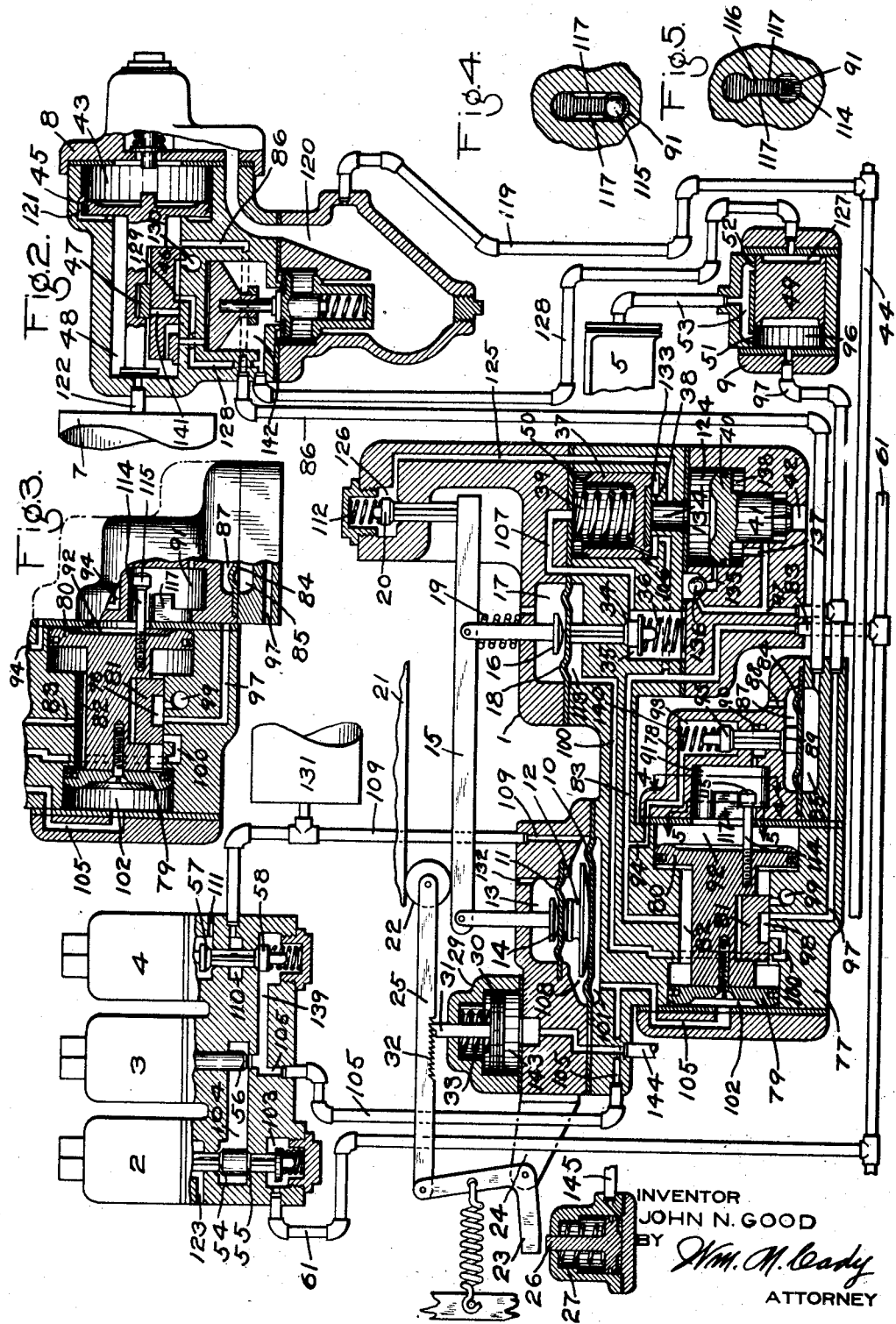
INVENTOR
JOHN N. GOOD
BY
Wm. M. Cady
ATTORNEY Patented Mar. 18, 1930

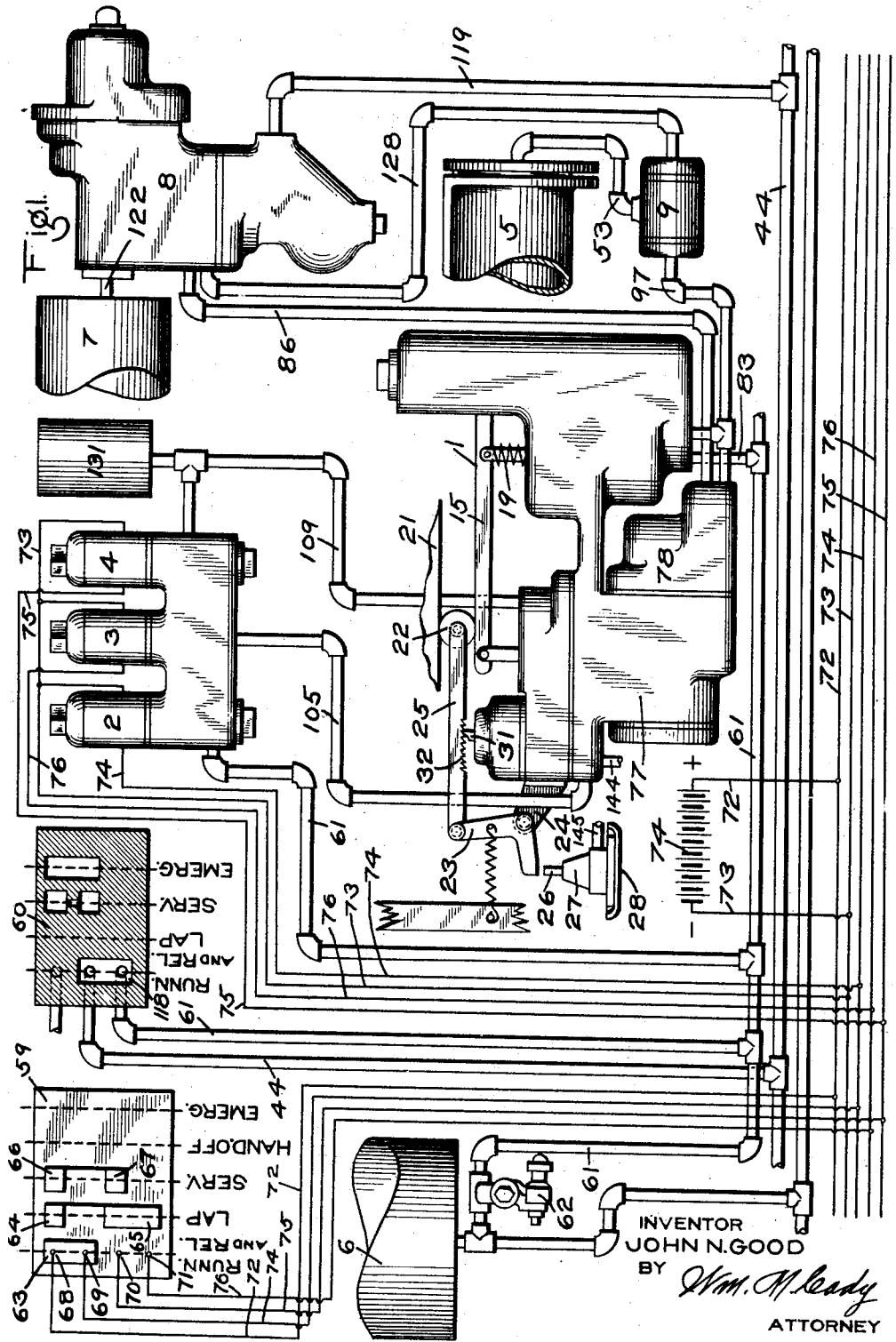

1,750,635

UNITED STATES PATENT OFFICE

JOHN N. GOOD, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA

VARIABLE-LOAD BRAKE

Application filed July 3, 1928. Serial No. 290,118.

This invention relates to variable load brake devices and has for an object the provision of an improved variable load device.

Another object of my invention is to provide an electro-pneumatic brake equipment in which the braking power is, under normal conditions, controlled electrically and in which under certain other conditions, is controlled pneumatically.

Another object of my invention is to provide an electro-pneumatic brake equipment in which the braking power is controlled according to the load on the car.

A further object of my invention is to provide an electro-pneumatic brake equipment in which the brake cylinder pressure is built up at a faster rate in an emergency application of the brakes than in a service application.

A still further object of my invention is to provide an electro-pneumatic brake equipment in which the brake control may be changed from electric to pneumatic without causing an emergency application of the brakes.

Another object of my invention is to provide an electro-pneumatic brake equipment with means operative automatically for changing the brake control from electric to pneumatic and vice versa, and which, when the brake equipment is being initially charged with fluid under pressure, will prevent an application of the brakes from being effected.

A more specific object of my invention is to provide an electro-pneumatic brake equipment in which the change-over valve device, which is operative to change the brake control from electric to pneumatic and from pneumatic to electric, is of such construction that the several parts thereof cannot be initially assembled unless the change-over valve and the means for operating it are in positions to prevent the flow of fluid under pressure to the brake cylinder when the equipment is being initially charged.

Other objects and advantages will appear in the following more detailed description of my invention.

In the accompanying drawings, Fig. 1 is a diagrammatic view of an electro-pneumatic brake equipment embodying my invention; Fig. 2 is a sectional view of the same, some of the parts being omitted; Fig. 3 is a sectional view of a portion of the change-over valve device and illustrates the several parts thereof in their proper positions for assembly; and Figs. 4 and 5 are fragmentary cross-sectional views through the change-over valve device taken on the lines 4—4 and 5—5 respectively of Fig. 2.

As shown in the drawings, the equipment may comprise a variable load mechanism 1, magnet valve device having magnets 2, 3, and 4, a brake cylinder 5, a main reservoir 6, an auxiliary reservoir 7, a triple valve device 8, and a double check valve device 9.

The variable load mechanism may comprise a casing in which there are horizontally disposed spaced flexible diaphragms 10 and 11, having interposed therebetween a follower 12 adapted to cooperate with both diaphragms. Contained in a chamber 13, at one side of the diaphragm 11, and engaging the upper surface of the diaphragm, is a follower 14, having a vertically disposed stem operatively connected with one end of a horizontally disposed lever 15 which, intermediate its ends, is operatively connnected to a vertically disposed stem of a follower 16, contained in a chamber 17 at one side of a horizontally disposed flexible diaphragm 18, the follower 16 being spaced a slight distance above the upper surface of the diaphragm. Interposed between the lever 15 and the casing and surrounding the stem of the follower 16, is a spring 19. Beyond the stem of the follower 16, the end of the lever 15 is adapted to operatively engage the stem of a release valve 20.

Interposed between the body 21 of the car and the lever 15 is a movable member 22, preferably in the form of a roller, which engages the lever and forms a fulcrum therefor intermediate the stems of the followers 14 and 16. For the purpose of adjusting the position of the fulcrum member 22 along the lever 15, a bell crank lever 23 is provided which is pivotally connected with a bracket 24 mounted on the casing, one arm of the lever being operatively connected to the fulcrum member 22 through the medium of a link 25, and the other arm is adapted to be engaged by a plunger 26 of a piston device 27 which is preferably mounted on the spring plank 28 of a car truck.

Contained in a piston cylinder 29, in the casing, is a piston 30 having a stem 31 extending through the casing which is adapted to operatively engage with ratchet teeth 32 formed on the link 25 to maintain the fulcrum member 22 in its proper adjusted position when the car doors (not shown) are closed. Interposed between the upper face of the piston 30 and the casing and surrounding the stem 31 is a spring 33, the use of which will hereinafter appear.

The under side of the flexible diaphragm 18 engages the stem of a pilot valve 34 contained in a valve chamber 35 in the casing, and interposed between this valve and the casing is a spring 36.

Associated with the pilot valve 34 is a supply valve piston 37 which is adapted to seal against a seat ring 38, there being a spring 39 contained in the chamber 50, at one side of the valve, which tends to maintain the valve seated on the seat ring.

Contained in a vertically disposed cylinder in the casing is a quick release piston 40 having a downwardly depending shouldered stem, the lower portion of which carries a discharge valve 41 operative to control the flow of fluid under pressure through an atmospheric passage 42.

The triple valve device 8 may comprise a casing having a piston chamber 43 connected to the brake pipe 44 and containing a piston 45, which is adapted to operate a main slide valve 46 and a graduating valve 47 contained in a valve chamber 48 which is connected to the auxiliary reservoir 7.

The check valve device 9 comprises a cylinder containing a double check valve 49 adapted to operate to control the flow of fluid under pressure through ports 51 and 52 leading to the brake cylinder through a passage and pipe 53.

The magnets 2, 3, and 4 of the magnet valve device are adapted to operate double beat valves 54 and 55, valve 56 and double beat valves 57 and 58, respectively.

In the operator's cab, an electric brake switch device 59 and a brake valve device 60 of the usual type may be provided. Normally the switch device 59 is used to control the operation of the brake, but if for any reason the brake cannot be properly controlled by this device, the brake valve device 60 may be used. When the switch device 59 is used, the brake valve device will be in running position, as shown in Fig. 1 of the drawings, in which the brake pipe 44 and pipe 61 leading from a feed valve device 62 are connected.

The brake switch device 59 may comprise movable connectors 63, 64, 65, 66, and 67, and may also comprise contact terminals 68, 69, 70, and 71. The connectors 64 and 65 are electrically connected together and the connectors 66 and 67 are also electrically connected together.

Extending throughout the length of the car or train there are electric circuit wires 72, 73, 74, 75, and 76. The circuit wires 72 and 73 are connected to the positive and negative terminals respectively of a battery 74 or other suitable source of current supply. The wire 72 is also connected to the contact terminal 68 of the switch device 59. The circuit wires 74, 75, and 76 are connected to the contact terminals 69, 70, and 71 respectively of the brake switch 59 and are further connected to one terminal of the magnets 2, 4, and 3, respectively. The other terminal of each magnet is connected with the wire 73.

Associated with the variable load mechanism, triple valve device 8 and check valve device 9, is a change-over valve device, which may comprise a cylinder portion 77 and a head portion 78. The cylinder portion contains connected pistons 79 and 80 adapted to operate a slide valve 81 contained in a valve chamber 82 which is connected to the pipe 61 through a pipe and passage 83.

Mounted in the head portion 78 is a flexible diaphragm 84, the chamber 85 at one side thereof being connected to the valve chamber 48 of the triple valve device, through a pipe and passage 86, and the chamber 87 at the other side of the diaphragm being connected to the atmosphere through an atmospheric passage 88.

Contained in the diaphragm chamber 87 is a valve 89 which engages with the diaphragm 84 and is operative to control communication from a chamber 90 to the chamber 87, which chamber 90 is connected to a chamber 91 which in turn is connected to the piston chamber 92 at one side of the change-over piston 80.

Contained in a chamber 93 in the head portion 78, which chamber is connected to the passage 83 through a passage 94, is a valve 95 which is connected, through the medium of a stem, with the valve 89, which valve 95 is adapted to control communication through which fluid under pressure is supplied to piston chamber 91.

The change-over valve device has two positions, one position in which fluid under pressure from the brake cylinder is vented to the atmosphere by way of pipe and passage 53, port 51, and valve chamber 96 in the check valve device 9, pipe and passage 97, a cavity 98 in the change-over slide valve 81, and atmospheric passage 99, and another position in which fluid under pressure flows to the brake cylinder from a passage 100, through cavity 98 in the slide valve 81, pipe and passage 97, and valve chamber 96, port 51 and passage 53 in the check valve device and then through pipe 53.

When assembling the change-over valve device, the change-over pistons and change-over slide valve should be in their right hand positions as shown in Fig. 3 of the drawings, in which positions the slide valve will lap the passage 100 and will, at the same time, through the medium of the cavity 98 in the slide valve, connect the brake cylinder to the atmosphere in the manner hereinbefore described.

With the change-over valve in its right hand position, and the equipment is being initially charged with fluid under pressure, prior to the energizing of any of the magnets 2, 3, and 4, fluid under pressure supplied by the feed valve 62 will flow to the diaphragm chamber 101 at one side of the flexible diaphragm 10 and to a piston chamber 102 at one side of the small change-over piston 79, through pipe 61, a chamber 103 and valve chamber 104 in the magnet valve device and then through passage and pipe 105.

At the same time as fluid under pressure is supplied to the chambers 101 and 102, fluid under pressure also flows from the pipe 61 to the change-over valve chamber 82 and to the outer seated area of the supply valve piston 37 through pipe and passage 83. At the same time fluid under pressure from the passage 83 will be supplied to the change-over piston chamber 92 through passage 94, valve chamber 93 in the cylinder head portion of the change-over valve device, past the open valve 95 and through chambers 90 and 91.

Fluid under pressure supplied through the passage and pipe 83 to the outer seated area of the supply valve piston 37 flows through a small passage 106 in the piston to the piston chamber 50 and from thence through a passage 107 to the pilot valve chamber 35.

With the magnets 2, 3, and 4 deenergized, the diaphragm chamber 108, which contains the follower 12, will be vented to the atmosphere through passage and pipe 109, chamber 110 in the magnet valve device, past the unseated valve 57, and through an atmospheric passage 111.

When the chamber 108 is thus vented and fluid under pressure is supplied to the diaphragm chamber 101, the diaphragm 10 will operate to cause the follower 12, diaphragm 11, follower 14 and the end of the lever 15 connected to the follower 14, to move upwardly, thus rotating the lever about its fulcrum 22, causing the other end portion of the lever to move downwardly against the pressure of the spring 19.

As this end of the lever 15 is moved downwardly, the pressure of the spring 112 will cause the release valve 20 to seat. After the valve 20 is seated, further downward movement of the lever 15 will cause the follower 16 and flexible diaphragm 18 to operate to unseat the pilot valve 34, and fluid under pressure will flow to a chamber 113 at one side of the flexible diaphragm 18 and to the seat of the change-over slide valve through passage 100.

It will here be noted that if the change-over valve device were in its left hand position, passage 100 which is initially charged with fluid under pressure, as just described, would be connected, through the cavity 98 in the slide valve 81, to the passage 97 leading to the brake cylinder 5, and an application of the brakes would be effected. When the change-over valve device is in its right hand position, the passage 97 is connected to atmosphere through cavity 98 in the slide valve 81 and atmospheric passage 99 and the passage 100 is lapped by the slide valve 81.

It will thus be seen that it is important to have the piston and slide valve of the change-over valve device in their right hand positions before initially charging the system with fluid under pressure, and to insure the proper positioning of the pistons and slide valve, the several parts of the device are so formed that, before they can be assembled, the pistons and slide valve must be in their right hand positions.

For the purpose of insuring the proper assembly of the change-over valve device, the piston 80 is provided with an outwardly extending member 114, which in the present embodiment of the invention is in the form of a bolt having at one end screw-threaded connection with the piston and having its outer end enlarged to form a head 115 which is adapted to extend into the chamber 91 of the head portion 78 when the change-over valve device is assembled. The opening 116 in the head portion 78, leading to the piston chamber 92 is in the form of a slot, the upper end of which is made large enough to permit the head 115 of the bolt 114 to be inserted therethrough into the chamber 91. The width of the lower portion of the slot is restricted and is slightly larger than the diameter of the bolt 114.

In assembling the change-over valve device, the pistons and slide valve are first placed in their right hand positions, then the head portion is placed in the position as shown in Fig. 3 of the drawings, in which position the head 115 of the bolt will be free of spaced restrictions 117 formed on the walls defining the chamber 91. The head portion is now moved upwardly to the position as shown in dot and dash lines in Fig. 3, and as it is so moved, the restrictions 117 will clear the head 115 of the bolt.

If the piston is not in its proper position and the head portion 78 is moved upwardly, the restrictions 117 will engage the head 115 of the bolt and thus stop further upward movement of the head portion and it could not be assembled until the piston has been moved to its proper position.

When the piston 80 is in its left hand position, the head 115 will project outwardly beyond the cylinder portion 77 as shown in Fig. 2 of the drawings, and if the piston were in this position in assembling, the head portion 78 could not be moved to its proper position, due to the restrictions 117 engaging the head of the bolt. Since the lower portion of the slot 116 is of less width than the diameter of the head 115 of the bolt, the head portion 78 cannot be directly placed in its proper position but must first be placed in the position as shown in Fig. 3 and then moved upwardly to its proper position. It will thus be seen that this construction will insure the proper positioning of the change-over pistons and slide valve when the change-over valve device is being assembled.

In initially charging the apparatus, fluid under pressure supplied by the feed valve 62 will flow through pipe 61, cavity 118, in the rotary valve of the brake valve device, to the brake pipe 44, and from thence through a branch pipe 119 and passage 120 in the triple valve device, to the piston chamber 43, then through a feed groove 121 to the slide valve chamber 48.

From this chamber fluid under pressure flows through pipe 122 to the auxiliary reservoir 7 and charges it, and also flows through passage and pipe 86 into the diaphragm chamber 85 of the change-over valve device.

Pressure of fluid thus supplied to this chamber 85 causes the diaphragm 84 to operate to seat the valve 89 and to unseat the valve 95 against the pressure of a spring 140 contained in the valve chamber 93.

With the valve 95 unseated, fluid under pressure from the chamber 93 will flow through chambers 90 and 91 and slot 116 into the piston chamber 92.

Since the piston chambers 92 and 102 and valve chamber 82 of the change-over valve device are all supplied with fluid under pressure from the feed valve, the pistons 79 and 80 and slide valve 81 will not move from their right hand positions.

In operation, with the apparatus initially charged and both the brake switch device 59 and brake valve device 60 in running and release position and the source of current connected to the circuit wires, the magnet 2 will be energized, causing the valve 55 of the magnet valve device to seat and the valve 54 to unseat.

Since the magnet 3 has not been energized, the valve 56 will be unseated, so that fluid under pressure in the piston chamber 102 of the change-over valve device and the diaphragm chamber 101 will be vented to the atmosphere by way of passage and pipe 105, chamber 104 in the magnet valve device, past the open valve 54 and through atmospheric passage 123. As the magnet 4 has not been energized, the valve 58 is seated and the valve 57 unseated, so that the diaphragm chamber 108 is vented to the atmosphere by way of pipe and passage 109, chamber 110 in the magnet valve device, past the unseated valve 57 and through atmospheric passage 111.

Upon the venting of the diaphragm chamber 101, the pressure of the spring 19 will cause the lever 15 to move upwardly about its fulcrum 22, moving the follower 16 upwardly with it out of engagement with the diaphragm 18, thus permitting the pressure of the spring 36 to seat the pilot valve 34 and close off the further supply of fluid under pressure to the passage 100.

Since the piston chamber 102 of the change-over valve device is vented to the atmosphere, the pressure of fluid supplied to the piston chamber 92 and the valve chamber 82 will cause the change-over pistons and slide valve to move to their left hand positions in which the cavity 98 in the slide valve will connect the passage 100 with the passage 97 leading to the brake cylinder. In this position the slide valve will lap the atmospheric passage 99.

When the lever 15 is in its uppermost position it will maintain the release valve 20 unseated, so that a piston chamber 124 at one side of the piston 40 will be vented to the atmosphere by way of a passage 125 and release valve chamber 126.

With the brake valve device 60 in running and release position, the triple valve device 8 will be in its release position, in which the chamber 127, at one side of the check valve 49, is connected to atmosphere by way of pipe and passage 128, cavity 129 and atmospheric passage 130.

If it is desired to effect an electric service application of the brakes, the brake switch 59 is moved to service position, in which the magnets 2 and 3 are deenergized and the magnet 4 energized. The magnets 2 and 3 being deenergized, the valves 55 and 56 will be unseated and the valve 54 seated, and the magnet 4 being energized, the valve 58 will be unseated and the valve 57 seated.

With the valves 55, 56 and 58 unseated, fluid under pressure from the feed valve 62 will be supplied to the diaphragm chamber 101 and piston chamber 102 of the change-over valve device by way of pipe 61, chambers 103, 104, and 139 in the magnet valve device and pipe and passage 105. From the passage 139 fluid under pressure also flows to a volume reservoir 131 and to the flexible diaphragm chamber 108 by way of chamber 110 in the magnet valve device and pipe and passage 109. Fluid under pressure thus supplied to the diaphragm chambers 101 and 108 will equalize, and due to this, the large diaphragm 10 will not operate.

Since the diaphragm chamber 13 is vented to the atmosphere through an atmospheric passage 132, the pressure of fluid in the chamber 108, acting on the small diaphragm 11, will cause this diaphragm, together with the follower 14 and one end of the lever 15, to move upwardly, the lever moving about its fulcrum 22, which results in the opposite end of the lever moving downwardly against the pressure of the spring 19.

As this latter end of the lever moves downwardly, the pressure of the spring 112 will cause the release valve 20 to seat. When the valve 20 seats, the follower 16 engages the diaphragm 18 and moves it downwardly, unseating the pilot valve 34 against the pressure of the spring 36. With the valve 34 unseated, fluid under pressure, supplied by the feed valve 62, flows from the chamber 50 at one side of the supply valve piston 37 to the brake cylinder 5 by way of passage 107, pilot valve chamber 35, past the unseated pilot valve 34, to diaphragm chamber 113, and from thence through passage 100, cavity 98 in the change-over slide valve 81, passage and pipe 97, valve chamber 96 of the check valve device 9, port 51 and passage and pipe 53.

As the flow of fluid under pressure from the chamber 50 is at a faster rate than fluid under pressure can be supplied through the small passage 106 in the supply valve piston 37, the pressure of fluid in this chamber will be reduced and the pressure of fluid in chamber 133, supplied through passage 83, acting on the outer seated area of the piston 37 will cause said piston to move upwardly from its seat ring 38 against the pressure of the spring 39. Fluid under pressure will now flow to the brake cylinder by way of a passage 134, piston chamber 124, a passage 135, past a ball check valve 136, through passage and pipe 97, valve chamber 96 in the check valve device, port 51 and passage and pipe 53. From the passage 133, fluid under pressure also flows through passage 137 into the quick release piston chamber 138. As the pressure of fluid in the brake cylinder increases, the pressure of fluid in the piston valve chamber 50 increases and when the pressure of fluid in this chamber, together with the pressure of the spring 39 is greater than the pressure of fluid in the chamber 133 acting on the under side of the piston valve 37, said valve will seat on the seat ring 38.

In effecting a service application of the brakes, which may be less than a full service application, fluid under pressure flows to the brake cylinder so long as the brake switch is held in service position. When the desired brake cylinder pressure has been attained, the brake switch 65 is moved to lap position, in which the magnet 2 is deenergized and the magnets 3 and 4 energized. Upon the energization of the magnet 3, the valve 56 will be seated, so that further flow of fluid under pressure from the feed valve 62 to the diaphragm chambers 108 and 101 is closed off.

Now when the pressure of fluid supplied to the brake cylinder and acting on the diaphragm 18 is sufficient to move the flexible diaphragm 18, follower 16 and one end of the lever 15 upwardly against the pressure of fluid acting on the diaphragm 11, follower 14 and other end of the lever 15, the pressure of the spring 36 will cause the pilot valve 34 to seat, thus closing communication of the chamber 50 with the brake cylinder. When the pressure of fluid in the chamber 50, supplied through the small passage 106, combined with the pressure of the spring 39 contained in this chamber, becomes greater than the pressure of fluid in the chamber 133, the piston valve 37 will seat on the seat ring 38 and thus close off further supply of fluid under pressure to the brake cylinder. It will be noted that as the end of the lever 15 is moved upwardly by the action of the flexible diaphragm 18, the pilot valve 34 will seat before the lever engages the stem of the release valve 20, and as the supply of fluid to the diaphragm chamber 113 has been closed off by the seating of the pilot valve 34 and piston valve 37, the bar 15 will come to rest before it engages the stem of the release valve 20, so that said valve 20 will remain seated and the pressure of fluid in the brake cylinder will be bottled up.

If leakage of fluid under pressure from the brake cylinder should occur, the pressure of fluid in the chamber 113, which is in communication with the brake cylinder, will be reduced, and the follower 16 and diaphragm will move downwardly and unseat the pilot valve 34, thus reducing the pressure in the chamber 50. Fluid under pressure in the chamber 133 will cause the piston valve 37 to unseat and fluid under pressure will again flow to the brake cylinder until the pressure of fluid therein is sufficient to again move the diaphragm 18, follower 16 and one end of the lever upwardly in the manner hereinbefore described, thus maintaining the desired brake cylinder pressure against leakage.

If it is desired to release the brakes, the brake switch is moved to running and release position, in which the magnet 2 is energized and the magnets 3 and 4 deenergized. The valve 55 is therefore held seated and valve 54 unseated, the valve 56 unseated, the valve 57 unseated and the valve 58 seated. With valves 54 and 56 unseated, the diaphragm chamber 101 is vented to the atmosphere through passages and pipe 105, passage 104, and atmospheric passage 123. At the same time, with the valve 57 unseated, fluid under pressure in the diaphragm chamber 108 and volume reservoir 131 is vented to the atmosphere through pipe and passage 109, chamber 110 and atmospheric passage 111. With the diaphragm chambers 101 and 108 thus vented to the atmosphere, the pressure of the spring 19 will cause one end of the lever 15 to move upwardly, about the roller 22, into engagement with the stem of the release valve 20, causing said valve to unseat so that fluid under pressure in the quick release piston chamber 124 will be vented to the atmosphere by way of passages 134 and 125 and release valve chamber 126. The pressure of fluid in piston chamber 138 will now cause the quick release piston to move upwardly, unseating the valve 41, so that fluid under pressure from the brake cylinder will be vented to the atmosphere through pipe and passage 53, port 51, valve chamber 96 of the check valve device 9, pipe and passages 97 and 137 past the unseated valve 41 and through the atmospheric passage 42.

To effect an emergency application of the brakes electrically, the brake switch 65 is moved to emergency position. In this position, the magnets 2, 3, and 4 are deenergized, thus seating the valves 54 and 58 and unseating the valves 55, 56, and 57. When the valve 57 is unseated, the diaphragm chamber 108 will be vented to the atmosphere by way of passage and pipe 109, chamber 110 and atmospheric passage 111, and with the valves 55 and 56 unseated, fluid under pressure from the feed valve 62 will be supplied to the diaphragm chamber 101 by way of pipe 61, chamber 103 in the magnet valve device, passage 104 and pipe and passage 105. Fluid under pressure is also supplied to the piston chamber 102 of the change-over valve device through passage 105. Since the diaphragm chamber 108 is vented to the atmosphere, the pressure of fluid in the diaphragm chamber 101 acting on the under side of the diaphragm 10 will cause the diaphragm, together with the diaphragm followers 12 and 14 and the end of the lever 15 which is connected with the follower 14, to move upwardly about the fulcrum roller 22, causing the other end of the lever 15 to move downwardly, permitting the release valve 20 to seat, and after this valve is seated, operating the diaphragm 18 to unseat the relay valve 34. With the valve 34 unseated, fluid under pressure will be supplied to the brake cylinder in the same manner as hereinbefore described in connection with the electric service application of the brakes.

In an electric emergency application of the brakes, a higher brake cylinder pressure is obtained than is obtained in an electric service application of the brakes. It will be noted that in an emergency application, fluid at brake cylinder pressure supplied to the diaphragm chamber 113 and acting on the diaphragm 18 and lever 15, must be great enough to overcome the pressure of fluid in the diaphragm chamber 101 acting on the large diaphragm 10, followers 12 and 14 and lever 15, before the pilot valve 34 and piston valve 37 are seated to cut off the supply of fluid under pressure to the brake cylinder, while in a service application, the pressure of fluid in the chamber 113 must only be great enough to overcome the pressure of fluid in the diaphragm chamber 108 acting on the smaller diaphragm 11. Thus, in an emergency application of the brakes, the pressure of fluid in the brake cylinder will be higher than in a service application.

In effecting an emergency application of the brakes, the flexible diaphragm chamber 108 is vented to the atmosphere and fluid under pressure is supplied to the diaphragm chamber 101, and this pressure acting on the large diaphragm 10 will, through the medium of the followers 12 and 14, lever 15, follower 16 and flexible diaphragm 18, cause the pilot valve to be unseated, which in turn causes the supply valve to be unseated and supply fluid under pressure to the brake cylinder. As the flow of fluid under pressure to the diaphragm chamber 101 is unrestrained, the rate at which the pressure is built up in this chamber is faster than the build up of brake cylinder pressure in the diaphragm chamber 113, so that the pilot valve 34 and supply valve 37 will remain unseated until the application of the brakes is effected.

In effecting a service application of the brakes the flow of fluid under pressure to the brake cylinder is not continuous, as is the case in an emergency application, but is checked or closed off at intervals during the service application, and this checking or closing off of the supply of fluid under pressure is due to the volume reservoir being connected to the diaphragm chamber 108. With the volume reservoir 131 and diaphragm chamber 108 thus connected, the rate at which pressure in the chamber 108 is built up will be retarded, so that when the pilot valve 34 and supply valve 37 are unseated, brake cylinder pressure in the diaphragm chamber 113 will build up at a faster rate than the pressure can be built up in the diaphragm chamber 108, with the result that the diaphragm 18 will move upwardly against the pressure of fluid in the chamber 108 acting on the diaphragm 11, which permits the pilot valve 34 to seat, causing the supply valve 37 to seat and cut off the further supply of fluid under pressure to the brake cylinder. Now when the pressure is again built up sufficiently in the chamber 108 to overcome the pressure of fluid in the diaphragm chamber 113, the diaphragm 18 will be moved downwardly, unseating the pilot valve 34, which in turn, causes the supply valve to unseat and again supply fluid under pressure to the brake cylinder, and these operations will continue until the desired service application of the brakes is effected.

It will be noted from the three preceding paragraphs that in an emergency application of the brakes, the brake cylinder pressure will be built up at a faster rate than in a service application.

In operating the brake electrically, the brake cylinder pressure will be automatically varied according to the load on the car. This variation in brake cylinder pressure is effected by the changing of the position of the fulcrum roller 22 along the lever 15. In the present embodiment of my invention, this adjustment is accomplished through the operation of the usual door engine (not shown). In opening the doors, one of the piston chambers of the door engine is vented to the atmosphere and as this chamber is vented, the piston chamber 143 at one side of the piston 30 will also be vented by way of pipe and passage 144, so that the pressure of the spring 33 will move the piston 30 downwardly, causing the pawl 31 to be moved out of engagement with the ratchet teeth 32 of the lever 15. Fluid under pressure supplied to the other piston chamber of the door engine also flows to the piston device 27 through pipe 145, causing the plunger 26 to be moved upwardly, and if the load on the car is such that the brake cylinder pressure should be increased, the plunger will engage the lever 23 and rotate it about its fulcrum a sufficient distance to cause the roller 22 to be moved to its proper adjusted position. Now when the door engine is operated to close the doors, fluid under pressure will be supplied to the chamber 143, causing the piston 30 to move upwardly so that the pawl 31 will engage one of the teeth 32 on the lever 15, thus holding the lever and fulcrum roller 22 in their adjusted positions until the doors are again opened.

Should the electric current supply fail at any time, the magnets 2, 3, and 4 will be deenergized and an emergency application will be effected in the same manner as when the brake switch is moved to emergency position.

To release the brakes after such an emergency application, the brake valve device 60 is first moved from running and release position to service position, in which a brake pipe reduction is effected which operates to cause movement of the triple valve device 8 to service position. In this position, the cavity 129 in the main slide valve 46 will connect the passage 86 to the atmospheric passage 130, thus venting fluid under pressure from the diaphragm chamber 85 in the change-over valve device.

When the chamber 85 is thus vented, the pressure of a spring 140 will cause the valve 95 to seat, closing off the supply of fluid under pressure from the passage 83 to the piston chamber 92. When the valve 95 is seated, the valve 89 will be unseated so that fluid under pressure in the piston chamber 92 will be vented to the atmosphere by way of chambers 91 and 90, diaphragm chamber 87 and atmospheric passage 88. Pressure of fluid supplied to piston chamber 102 and the valve chamber 82 will cause the change-over pistons 79 and 80 and slide valve 81 to move to their right hand positions.

With the slide valve 81 in this position, the passage 100 is lapped and the passage 97 is connected to the atmospheric passage 99 by way of the slide valve cavity 98, thus venting fluid under pressure from the valve chamber 96 of the check valve device 9.

When the main slide valve 46 of the triple valve device 8 is in service position, the passage 128 will be connected to the valve chamber 48 by way of the usual service port 141 in the main slide valve, so that fluid under pressure will flow from the chamber 48 and auxiliary reservoir 7 through this port 141 and passage and pipe 128 to the valve chamber 127 of the check valve device 9. Since the valve chamber 96 is vented, the pressure of fluid flowing into chamber 127 will cause the check valve 49 to shift to its left hand position, in which fluid under pressure will be supplied to the brake cylinder by way of port 52 and passage and pipe 53.

The brake valve device 60 is now moved to running and release position, in which the main slide valve 46 of the triple valve device 8 will close off the supply of fluid under pressure from the valve chamber 48 and auxiliary reservoir 7 to the brake cylinder. In this position, the cavity 129 in the slide valve 46 will connect the passage 128 to the atmospheric passage 130, so that fluid under pressure from the brake cylinder will be vented to the atmosphere by way of pipe and passage 53, port 52 in the check valve device 9, check valve chamber 127, passage and pipe 128, cavity 129 in the slide valve 46 of the triple valve device and atmospheric passage 130.

Further, the main slide valve 46, as it is moved to running and release position, uncovers the passage 86, so that fluid under pressure will again flow therethrough and through pipe 86 to the diaphragm chamber 85 of the change-over valve device, causing the valve 89 to seat and the valve 95 to unseat and permit fluid at feed valve pressure to flow to the piston chamber 92. As the piston chamber 102 and valve chamber 82 are supplied with fluid under pressure from the feed valve, pistons of the change-over valve device will be balanced and they, together with the slide valve 81, will remain in their right hand positions.

By operating the brake valve device 60, the brakes may be controlled pneumatically in the usual well known manner.

When the current supply is again cut in, and it is desired to change over from pneumatic to electric control, the brake switch 59 and brake valve device 60 are both moved to running and release position, in which the piston chamber 102 of the change-over valve device is vented to the atmosphere as hereinbefore described, and fluid under pressure will be supplied to the piston chamber 92.

Since fluid under pressure from the feed valve is at all times supplied to the valve chamber 82 of the change-over valve device, the pressure of fluid in chambers 82 and 92 will cause the connected pistons 79 and 80 and slide valve 81 to move to their left hand positions, in which the cavity 98 in the slide valve will connect passages 100 and 97, but flow of fluid under pressure to the brake cylinder through these passages is closed off by the pilot valve 34 which is seated.

Now when the brake switch 59 is moved to effect an application of the brakes, fluid under pressure is supplied to the brake cylinder 5 as hereinbefore described, the flow of fluid into the valve chamber 96 of the change-over valve device causing the valve to move to its right hand position.

In changing locomotives or cars, the circuit will be disconnected, and the magnets 2, 3 and 4 deenergized, which would effect an emergency application of the brakes, in the manner hereinbefore described, and in order to prevent such an application, the brake switch 59 is maintained in running and release position and the brake valve device 60 is moved to service position, in which a brake pipe reduction is effected, causing the triple valve device to move to service position. With the triple valve device in this position, the diaphragm chamber 85 of the change-over valve device will be vented to the atmosphere, so that the piston chamber 92 will be vented to the atmosphere as hereinbefore described, so that, fluid under pressure in the change-over piston chamber and valve chamber 81 will cause the connected pistons 79 and 80 and slide valve 81 to move to their right hand positions. With the slide valve 81 in this position, the passage 100 will be lapped and the passage 97 leading from the valve chamber of the check valve device 9 will be connected to the atmospheric passage 99.

With the check valve chamber 96 thus vented to atmosphere, the pressure of fluid supplied to the check valve chamber 127, by the triple valve device, causes the check valve 49 to move to its left hand position, in which fluid under pressure will flow from the chamber 127 to the brake cylinder.

When the circuit wires are disconnected as hereinbefore mentioned and the magnets 2, 3 and 4 deenergized, the pilot valve 34 will be unseated, but as the passage 100 is lapped by the slide valve 81 of the change-over valve device, there will be no flow of fluid under pressure from the chamber 50, so that the supply valve piston 37 will remain seated, thus preventing the flow of fluid under pressure to the brake cylinder. It will be noted that the apparatus may be changed over from electric to pneumatic control without effecting an emergency application of the brakes.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a braking apparatus, the combination with means for controlling the brakes electrically and means for controlling the brakes pneumatically, of means operative to render either the electric brake controlling means or the pneumatic brake controlling means effective to control the brakes, valve means operative to control the operation of the third mentioned means, and a triple valve device included in the pneumatic brake controlling means adapted to control the operation of said valve means.

2. In a braking apparatus, the combination with means for controlling the brakes electrically and means for controlling the brakes pneumatically, of means operative to render either the electric brake controlling means or the pneumatic brake controlling means effective to control the brakes, valve means operative to control the operation of the third mentioned means, pressure sensitive means for controlling the operation of said valve means, and a triple valve device included in the pneumatic brake controlling means adapted to control the operation of said pressure sensitive means.

3. In a braking apparatus, the combination with means for controlling the brakes electrically and means for controlling the brakes pneumatically, of a slide valve operative to render either the electric brake controlling means or the pneumatic brake controlling means effective to control the brakes, pistons subject to the pressure of fluid for operating said slide valve, pressure sensitive valve means operative to control the operation of said pistons, and valve means included in the pneumatically controlled means adapted to control the operation of said pressure sensitive valve means.

4. In a braking apparatus, the combination with means for controlling the brakes electrically and means for controlling the brakes pneumatically, of a slide valve operative to render either the electric brake controlling means or the pneumatic brake controlling means effective to control the brakes, pistons subject to the pressure of fluid for operating said slide valve, a double seating valve operative for at one time supplying fluid under pressure to a chamber containing one of said pistons and operative at another time for venting the fluid under pressure from said chamber, and means included in the pneumatic brake controlling means for controlling the operation of said double seating valve.

5. In a braking apparatus, the combination with means for controlling the brakes electrically and means for controlling the brakes pneumatically, of a slide valve operative to render either the electric brake controlling means or the pneumatic brake controlling means effective to control the brakes, pistons subject to the pressure of fluid for operating said slide valve, a double seating valve operative for at one time supplying fluid under pressure to a chamber containing one of said pistons and operative at another time for venting the fluid under pressure from said chamber, pressure sensitive means for operating said double seating valve and means included in the pneumatic brake controlling means for controlling the operation of said pressure sensitive means.

6. In a braking apparatus, the combination with means for controlling the brakes electrically and means for controlling the brakes pneumatically, of a slide valve operative to render either the electric brake controlling means or the pneumatic brake controlling means effective to control the brakes, pistons subject to the pressure of fluid for operating said slide valve, a double seating valve operative for at one time supplying fluid under pressure to a chamber containing one of said pistons and operative at another time for venting the fluid under pressure from said chamber, a flexible diaphragm for operating said double seating valve, and a triple valve normally subjecting said diaphragm to the pressure of fluid to operate said double seating valve to supply fluid under pressure to said piston chamber and operative to relieve said diaphragm of the pressure of fluid to operate said double seating valve to vent fluid under pressure from said chamber.

7. In a braking apparatus, the combination with means for controlling the brakes electrically and means for controlling the brakes pneumatically, of a slide valve operative to render either the electric brake controlling means or the pneumatic brake controlling means effective to control the brakes, pistons subject to the pressure of fluid for operating said slide valve, a double seating valve operative for at one time supplying fluid under pressure to a chamber containing one of said pistons and operative at another time for venting the fluid under pressure from said chamber, a flexible diaphragm normally subject to the pressure of fluid for operating said double seating valve to supply fluid under pressure to said piston chamber, and a triple valve device operative to relieve the diaphragm of pressure to operate said double seating valve to vent fluid under pressure from said piston chamber.

8. In a braking apparatus, the combination with means for controlling the brakes electrically and means for controlling the brakes pneumatically, of a slide valve operative to render either the electric brake controlling means or the pneumatic brake controlling means effective to control the brakes, pistons subject to the pressure of fluid for operating said slide valve, a double seating valve operative for at one time supplying fluid under pressure to a chamber containing one of said pistons and operative at another time for venting the fluid under pressure from said chamber, a flexible diaphragm subject to the pressure of fluid for operating said double seating valve to supply fluid under pressure to said piston chamber, and valve means included in the means for controlling the brakes pneumatically operative to relieve said diaphragm of pressure to operate said double seating valve to vent fluid under pressure from said piston chamber to atmosphere.

9. In a braking apparatus, the combination with means for controlling the brakes electrically and means for controlling the brakes pneumatically operative to relieve said diaphragm of pressure to operate said double controlling means or the pneumatic brake controlling means effective, said valve having an initial position to prevent an application of the brakes when the apparatus is initially charged with fluid under pressure, and means for preventing the assembly of said device when said valve is in a position other than said initial position.

10. In a braking apparatus, the combination with means for controlling the brakes electrically and means for controlling the brakes pneumatically, of a device including a valve operative to render either the electric brake controlling means or the pneumatic brake controlling means effective, said valve having an initial position to prevent an application of the brakes when the apparatus is initially charged with fluid under pressure, and means adapted to cooperate upon the assembly of said device for insuring the proper initial positioning of said valve.

11. In a braking apparatus, the combination with means for controlling the brakes electrically and means for controlling the brakes pneumatically, of a device operative to render either the electric brake controlling means or the pneumatic brake controlling means effective, said device comprising a plurality of parts including a valve, and means on said parts adapted to cooperate upon their being assembled for insuring a predetermined initial positioning of said valve.

12. In a braking apparatus, the combination with means for controlling the brakes electrically and means for controlling the brakes pneumatically, of a device operative to render either the electric brake controlling means or the pneumatic brake controlling means effective, said device comprising a cylinder portion and a separate head portion, a valve in said cylinder portion having an initial position in assembling the device, pistons in said cylinder portion for operating said valve, and means carried by one of said pistons adapted to cooperate with said head portion when said device is being assembled to insure the initial positioning of said valve.

13. In a braking apparatus, the combination with means for controlling the brakes electrically and means for controlling the brakes pneumatically, of a device operative to render either the electric brake controlling means or the pneumatic brake controlling means effective, said device comprising a cylinder portion and a separate head portion, a valve in said cylinder portion having an initial position in assembling the device, pistons in said cylinder portion for operating said valve, and means carried by one of said pistons adapted to prevent the assembly of said cylinder and head portions when said valve is in a position other than its initial position.

14. In a braking apparatus, the combination with means for controlling the brakes electrically and means for controlling the brakes pneumatically, of a change-over valve device operative to render either the electric brake controlling means or the pneumatic brake controlling means effective, said device comprising two casing sections, a valve in one of said sections having an initial assembly position, piston means for operating said valve, a member carried by said piston means having an enlarged outer end portion adapted in assembling the device to cooperate with the other of said sections to prevent the assembling of said sections when said valve is out of its initial assembly position and to permit the assembling of said sections when said valve is in its initial assembly position.

In testimony whereof I have hereunto set my hand, this 27th day of June, 1928.

JOHN N. GOOD.